(12) United States Patent
Owen

(10) Patent No.: US 11,345,428 B2
(45) Date of Patent: May 31, 2022

(54) STEERING CONTROL DEVICE FOR KICK SCOOTER

(71) Applicant: Neil Owen, Guangdong (CN)

(72) Inventor: Neil Owen, Guangdong (CN)

(73) Assignee: Dongguan Hongmei Sports Equipment Co., Ltd., Dongguan (CN)

( * ) Notice: Subject to any disclaimer, the term of this patent is extended or adjusted under 35 U.S.C. 154(b) by 365 days.

(21) Appl. No.: 16/731,096

(22) Filed: Dec. 31, 2019

(65) Prior Publication Data

US 2020/0130767 A1 Apr. 30, 2020

(51) Int. Cl.
*B62K 5/00* (2013.01)
*B62K 5/08* (2006.01)
*B62K 5/05* (2013.01)

(52) U.S. Cl.
CPC . *B62K 5/08* (2013.01); *B62K 5/05* (2013.01)

(58) Field of Classification Search
CPC .................................. B62K 5/08; B62K 5/05
USPC .................................................. 180/87.041
See application file for complete search history.

(56) References Cited

U.S. PATENT DOCUMENTS

| | | | |
|---|---|---|---|
| 6,286,843 B1 * | 9/2001 | Lin ...................... | A63C 17/014 280/11.28 |
| 6,398,238 B1 | 6/2002 | Shaw | |
| 8,448,954 B2 * | 5/2013 | Wilson ................. | A63C 17/012 280/11.27 |
| 8,696,000 B1 * | 4/2014 | Chen ..................... | B62K 3/002 280/87.041 |
| 8,958,602 B1 * | 2/2015 | Lane .................... | G06V 10/255 382/103 |
| 9,227,688 B1 * | 1/2016 | Owen ..................... | B62K 5/08 |
| 9,346,512 B2 * | 5/2016 | Yeh ......................... | B62K 5/05 |
| 9,522,710 B2 * | 12/2016 | Constien ............... | B62K 5/027 |
| 10,137,955 B1 * | 11/2018 | Wu ........................ | B62K 3/002 |
| 10,494,050 B2 * | 12/2019 | Eckert .................... | B62K 3/002 |
| 2004/0100053 A1 * | 5/2004 | Chen ..................... | B62K 3/002 280/87.041 |
| 2016/0339984 A1 * | 11/2016 | Li ............................ | A45C 9/00 |
| 2019/0118069 A1 * | 4/2019 | Augustin ............. | A63C 17/013 |

* cited by examiner

*Primary Examiner* — Hau V Phan

(57) ABSTRACT

A kick scooter has a steering control device including a seat including an oval hole and two side armrests each having a through hole; a connecting member including an intermediate hollow projection and two wings; two linking assemblies each including a linking bar having one end connected to either front wheel; a limit pin movably disposed in the oval hole and secured to the connecting member; and a restoring mechanism including a biasing member fastened by the limit pin, and two positioning members each moveably disposed through the through hole and having an anchor at one end in either end of the biasing member, a threaded section at the other end, an intermediate flange, and two nuts each secured to the threaded section. The seat and the linking assembly are pivotably fastened together. The seat, the linking assembly, and the connecting member are pivotably fastened together.

1 Claim, 15 Drawing Sheets

STEERING CONTROL DEVICE FOR KICK SCOOTER

BACKGROUND OF THE INVENTION

1. Field of the Invention

The invention relates to kick scooters and more particularly to a steering control device for a kick scooter having improved characteristics.

2. Description of Related Art

U.S. Pat. No. 6,398,238 to Shaw, discloses a steering control mechanism for a kick scooter. The steering control mechanism is provided in the main body of the kick scooter and adapted to control the steering direction of two front wheels and comprises a base secured to the main body; two steering bars each including a front pivot end pivotal about two distal ends of the base, a rear coupling end, and a middle side rod respectively connected to the front wheels for enabling the front wheels to be synchronously biased with the steering bars; an intermediate block pivotal about a middle part of the base and having a rear free end horizontally oscillated with the intermediate block within a limited angle; and two links having one end pivotal about the rear coupling end of each steering bar and the other end pivotal about the rear free end of each steering bar to form two parallel four-bar linkages.

While the device enjoys its success in the market, continuing improvements in the exploitation of steering control device for kick scooter of this type are constantly being sought.

SUMMARY OF THE INVENTION

It is therefore one object of the invention to provide a steering control device of a kick scooter including a deck and two front wheels, comprising a seat disposed at a front end of the deck and including first, second, third, and fourth pivots, a transverse oval hole, and two side armrests each having a through hole; a connecting member including an intermediate hollow projection, and two wings having a hole; two linking assemblies each including a linking bar having one end connected to one of the front wheels, a first pivot hole connected to the other end of the linking bar, and a second pivot hole at an open end; a limit pin movably disposed in the transverse oval hole and including an upper member having a threaded hole and a rim engaged with the transverse oval hole, a threaded lower member disposed through the intermediate hollow projection, and a nut secured to the threaded lower member to fasten the limit pin and the connecting member together; and a restoring mechanism including a biasing member engaged with the rim, a threaded fastener secured to the threaded hole to securely retain the biasing member, and two positioning members each moveably disposed through the through hole and having an anchor at one end disposed in either end of the biasing member, a threaded section at the other end, an intermediate flange stopped by the through hole, and two nuts each secured to the threaded section to hold the positioning member in place; wherein the first and second pivots are disposed through the first pivot holes to pivotably fasten the seat and the linking assembly together; and wherein the third and fourth pivots are disposed through the second pivot holes and the holes of the wings to pivotably fasten the seat, the linking assembly, and the connecting member together.

The above and other objects, features and advantages of the invention will become apparent from the following detailed description taken with the accompanying drawings.

DETAILED DESCRIPTION OF THE INVENTION

Figure 1:
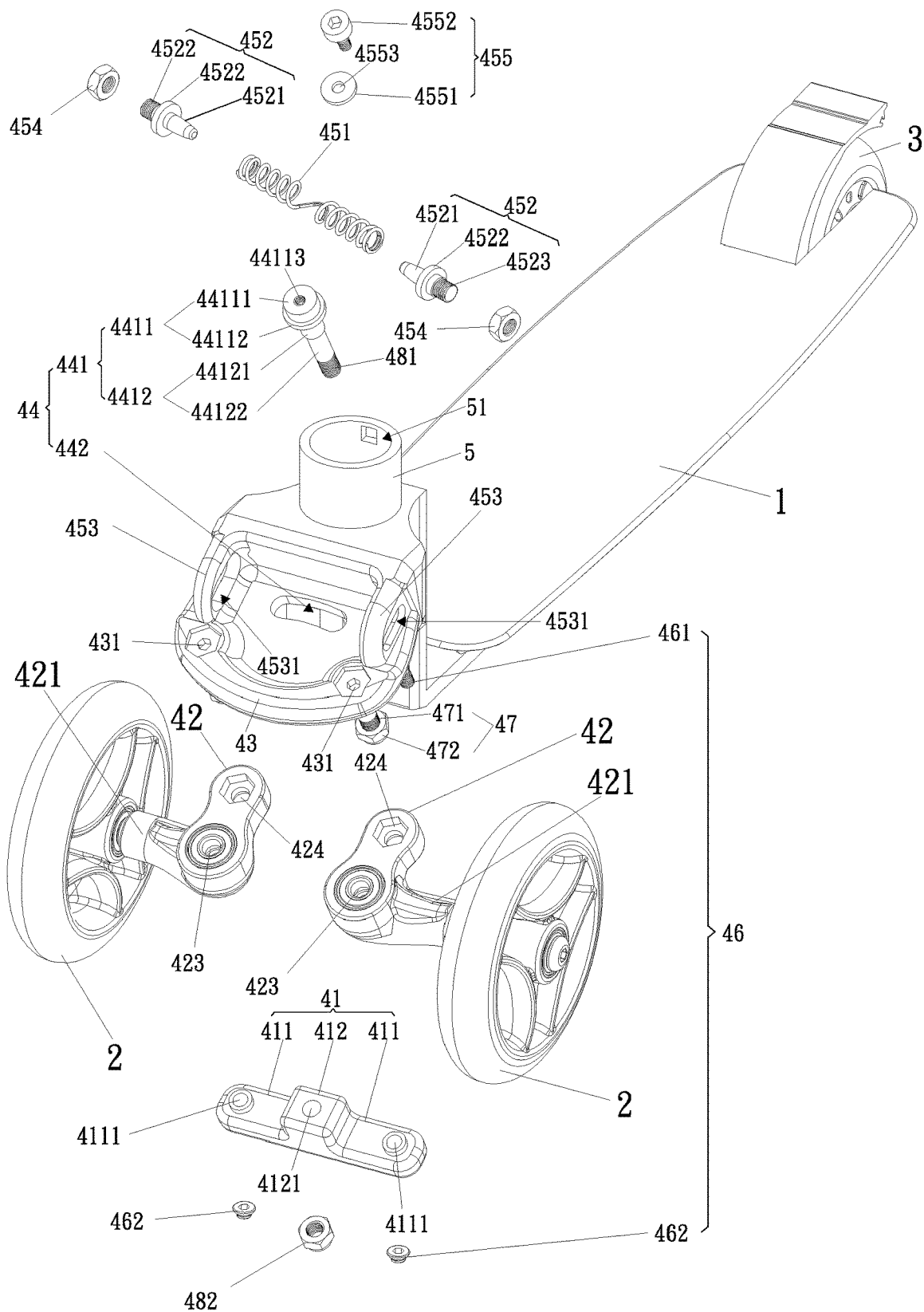
FIG. 1 is an exploded view of a kick scooter incorporating a steering control device according to the invention.
Figure 2:
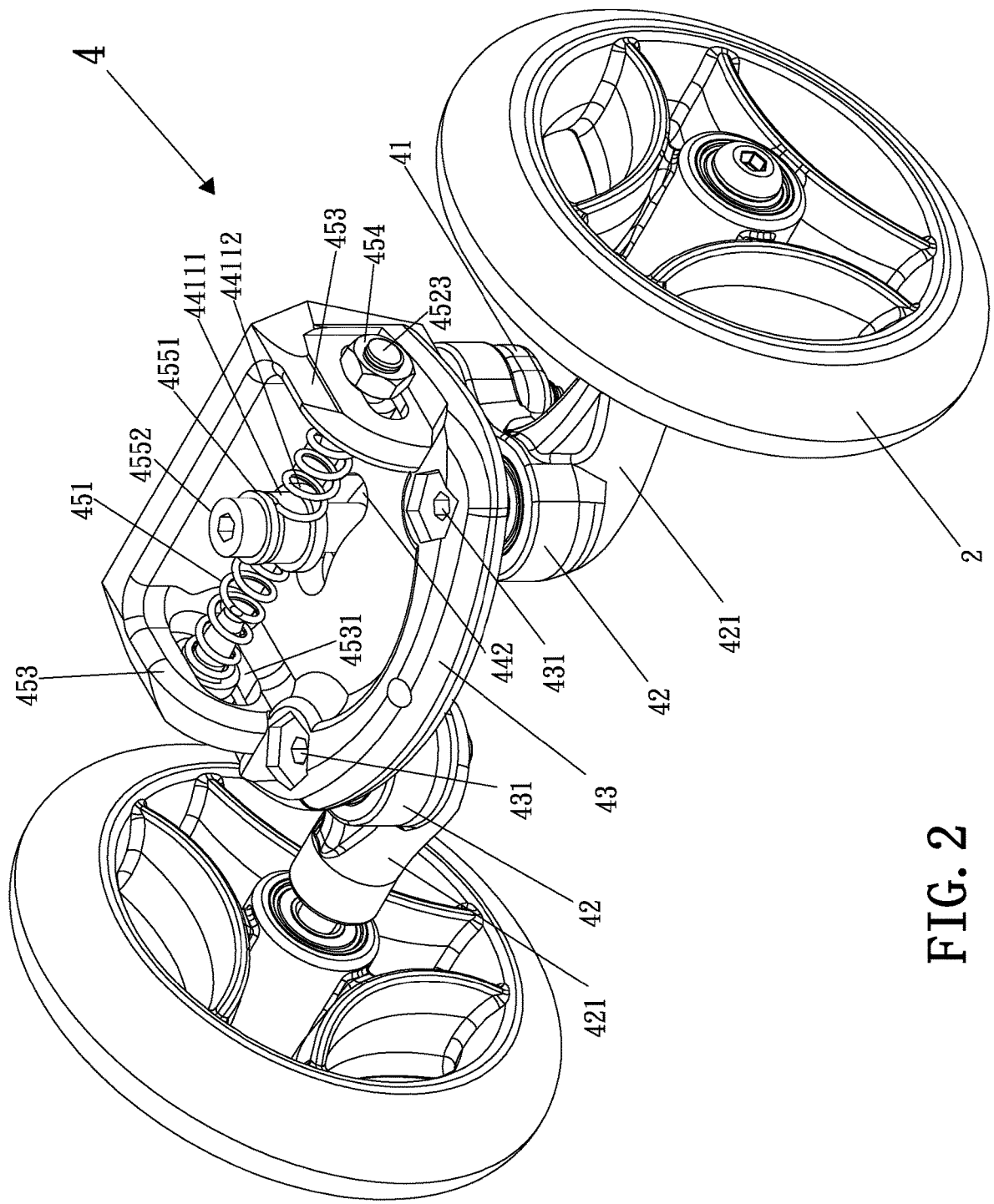
FIG. 2 is a perspective view of a front portion of the assembled kick scooter.
Figure 3:
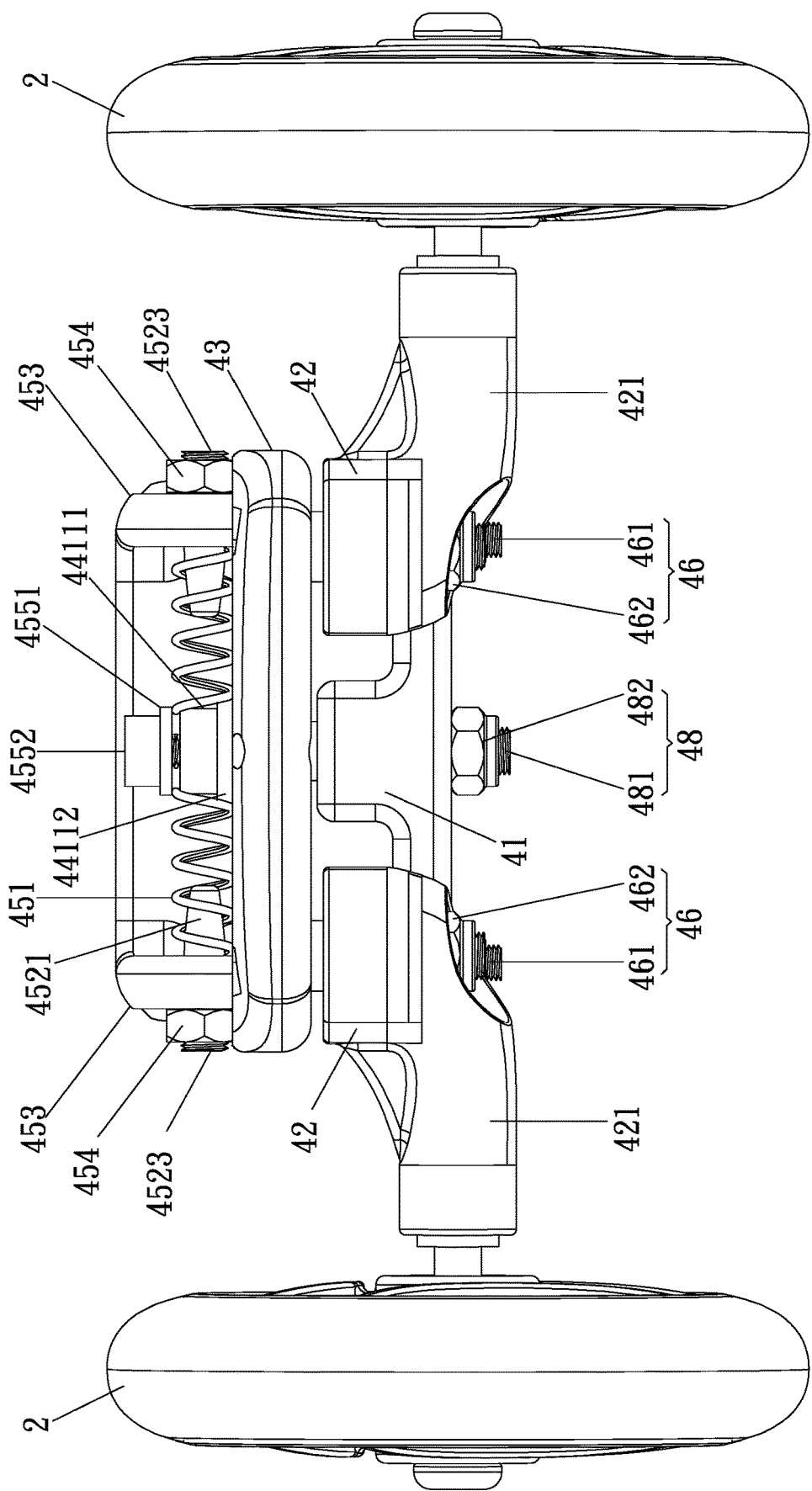
FIG. 3 is a front view of FIG. 2.
Figure 4:
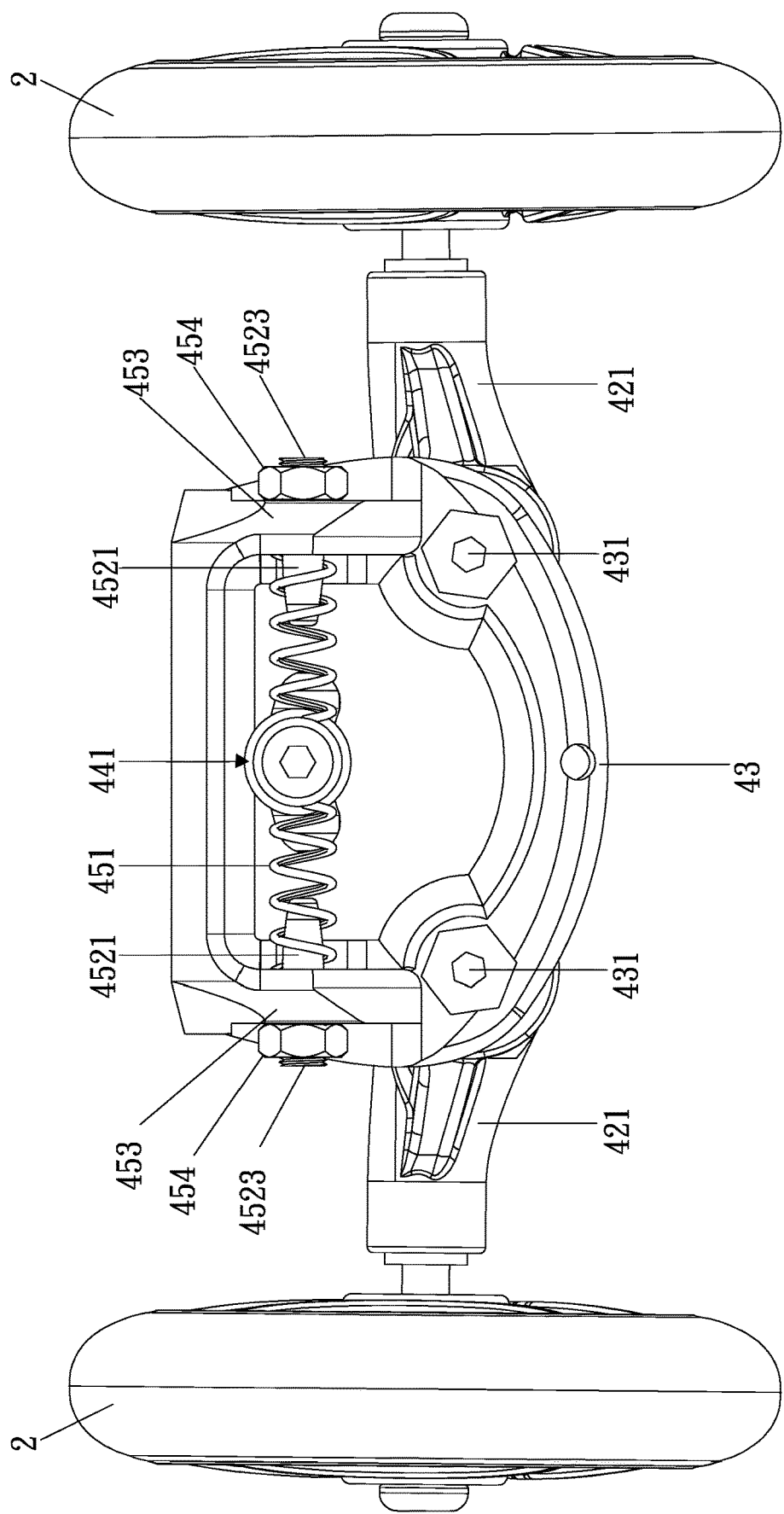
FIG. 4 is a top view of FIG. 2.
Figure 5:
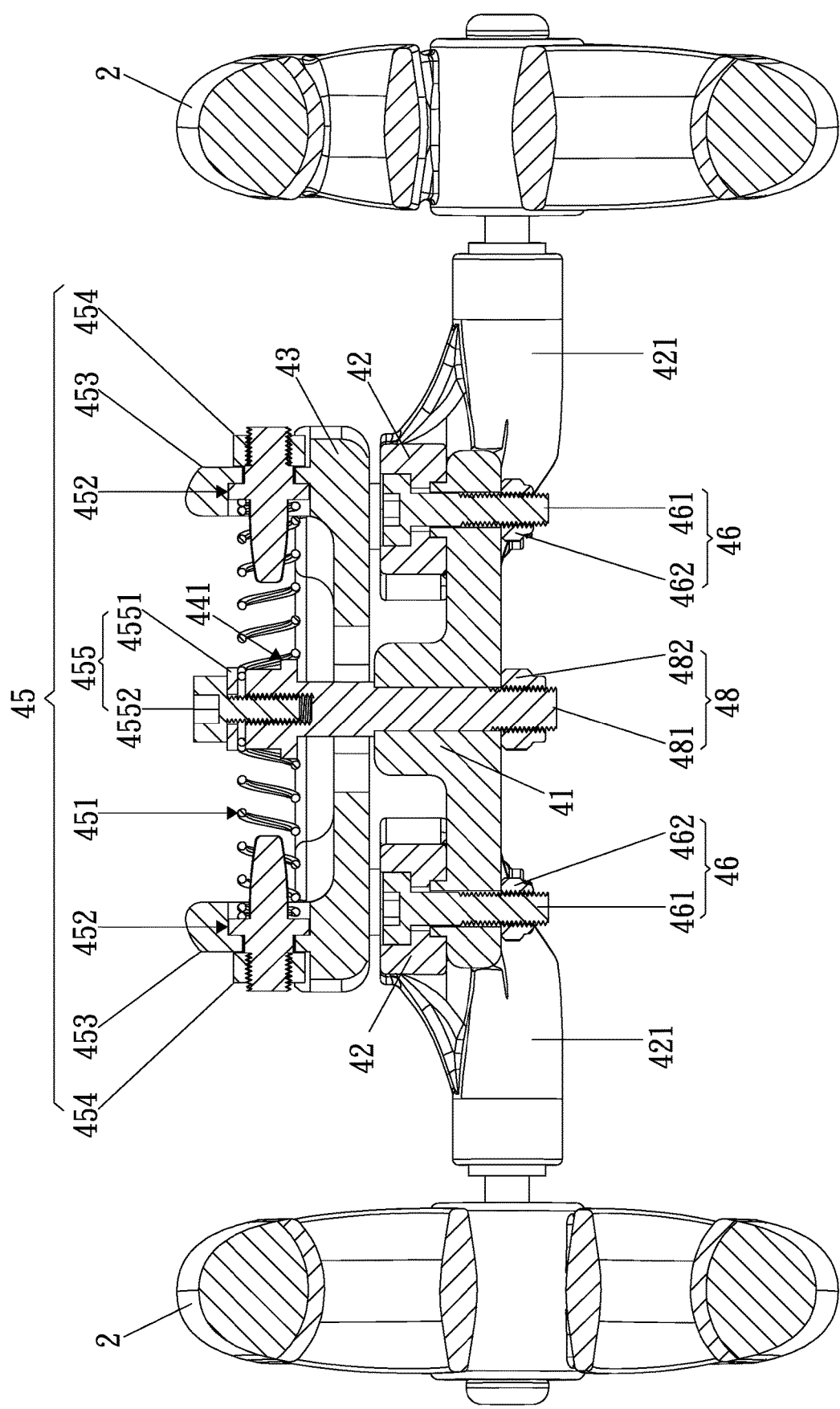
FIG. 5 is a longitudinal sectional view of FIG. 3.
Figure 6:
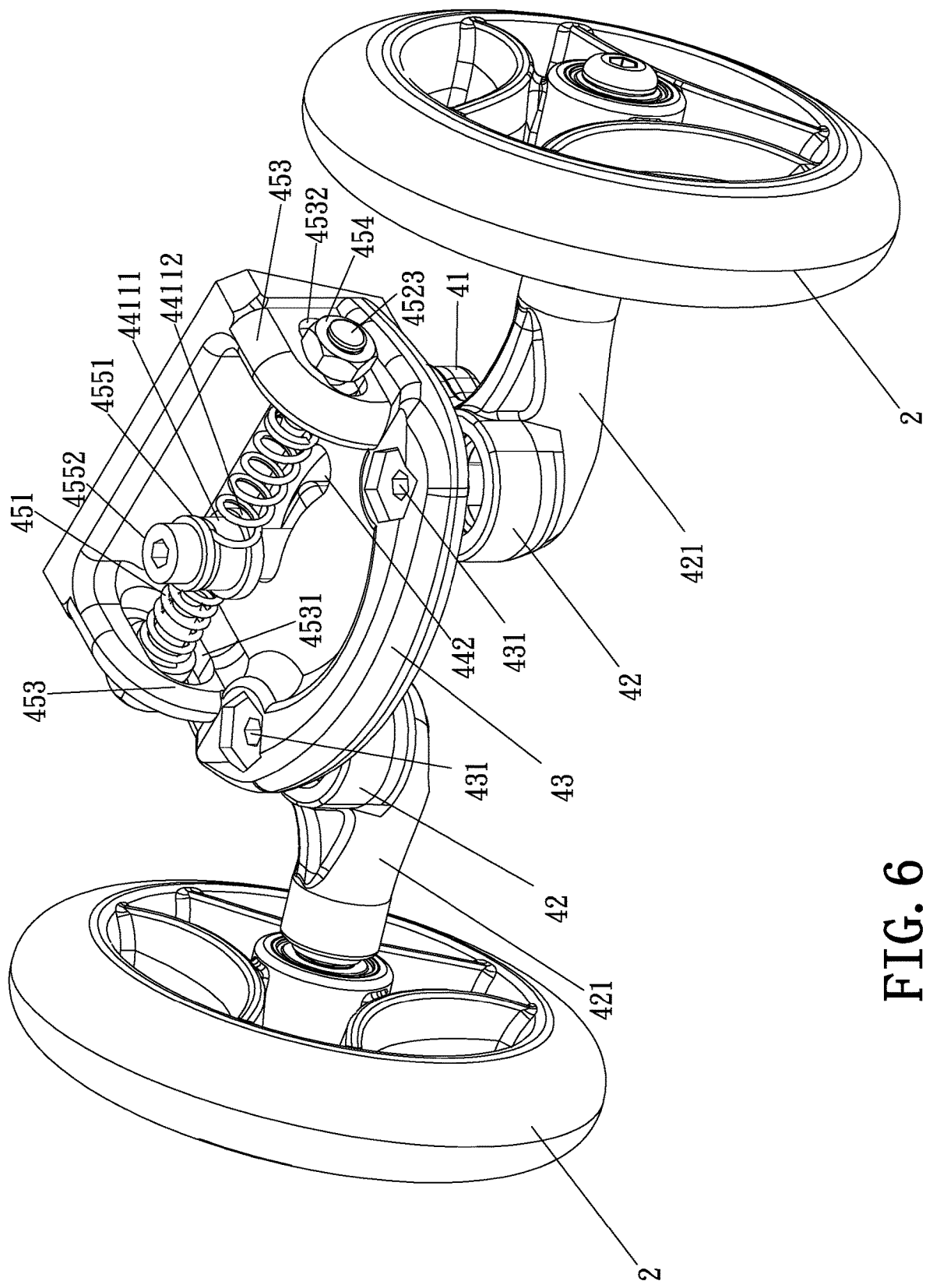
FIG. 6 is a view similar to FIG. 2 showing the front wheels turning left.
Figure 7:
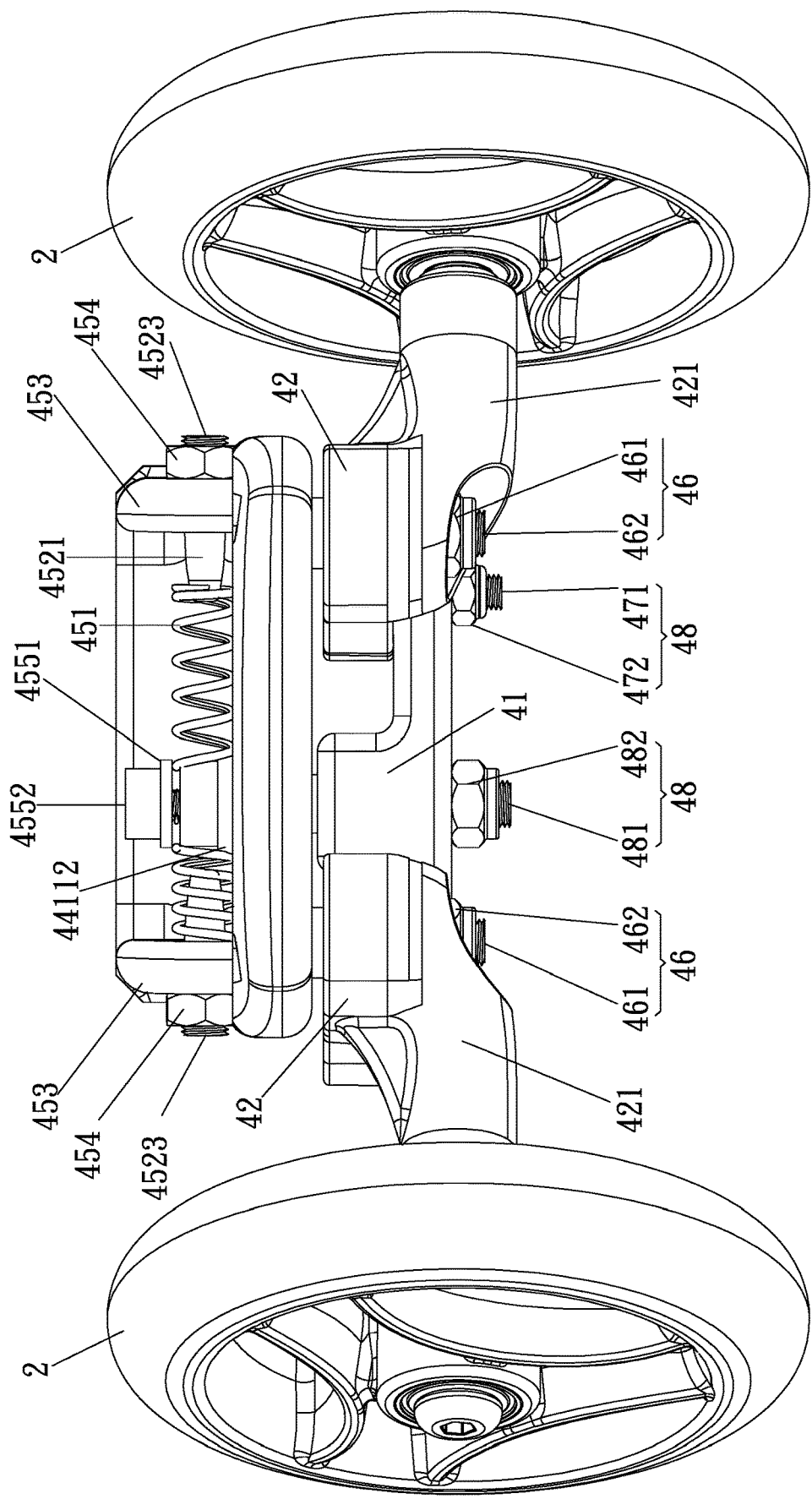
FIG. 7 is a front view of FIG. 6.
Figure 8:
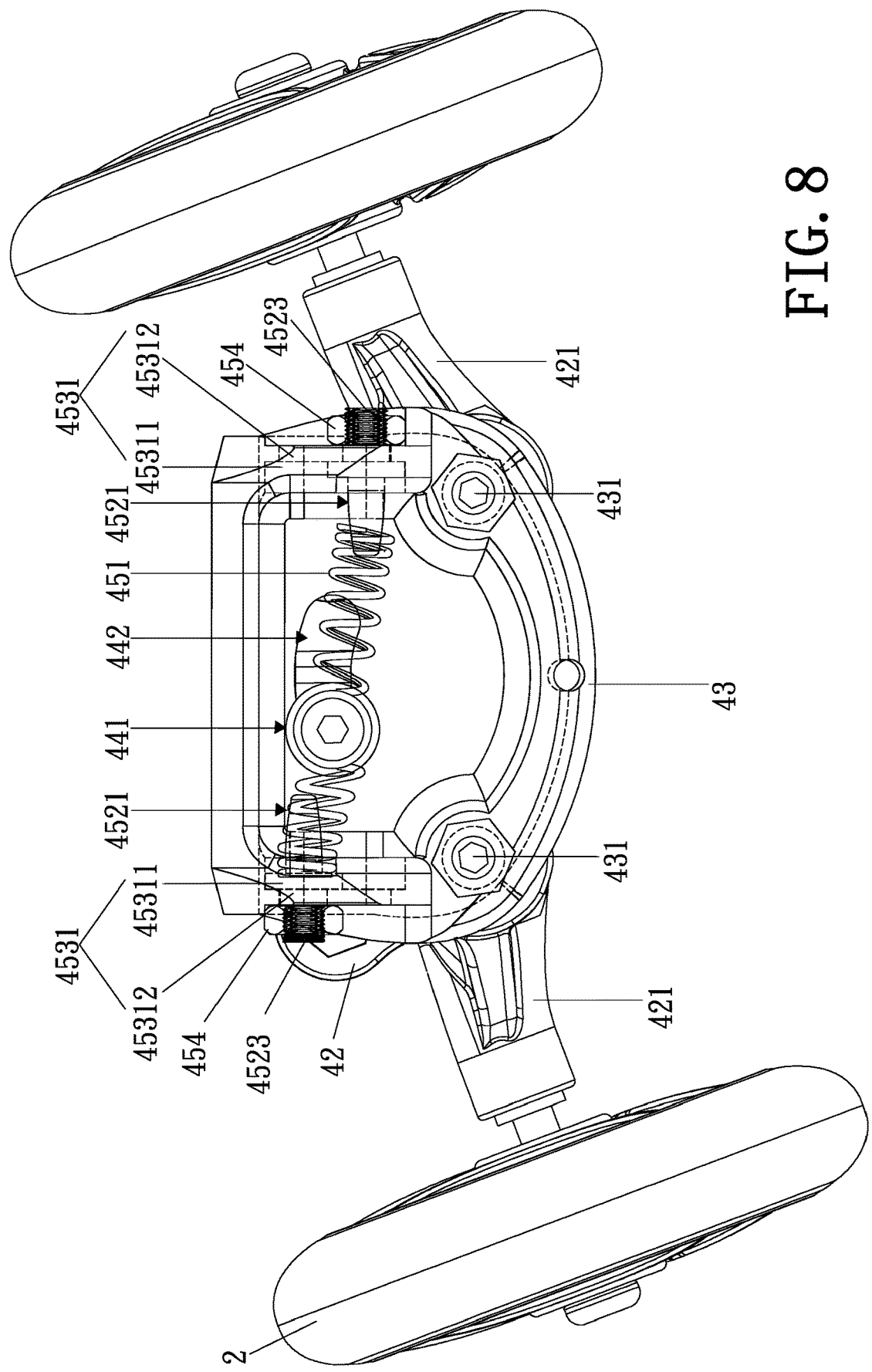
FIG. 8 is a top view of FIG. 6.
Figure 9:
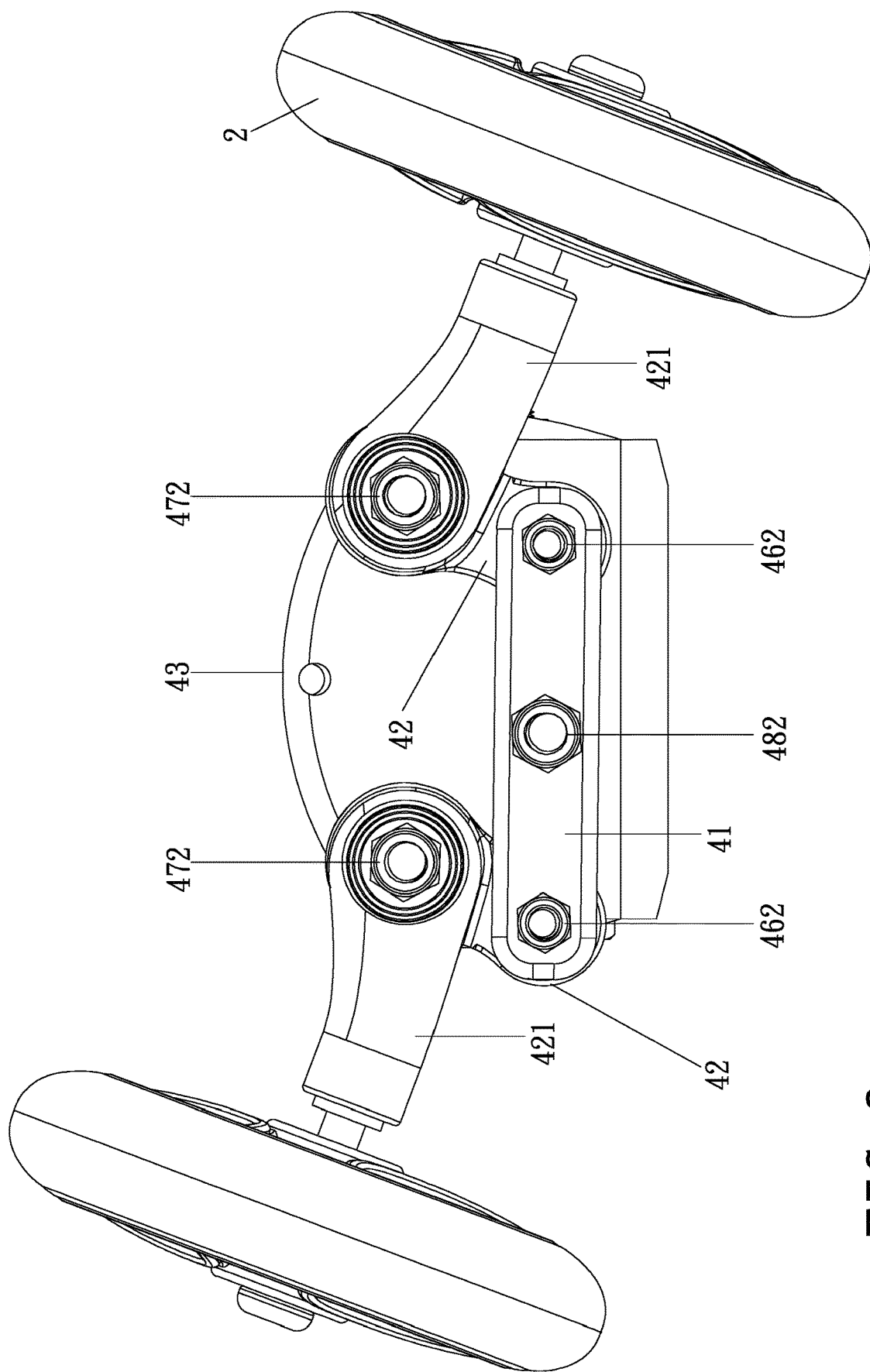
FIG. 9 is a bottom view of FIG. 6.
Figure 10:
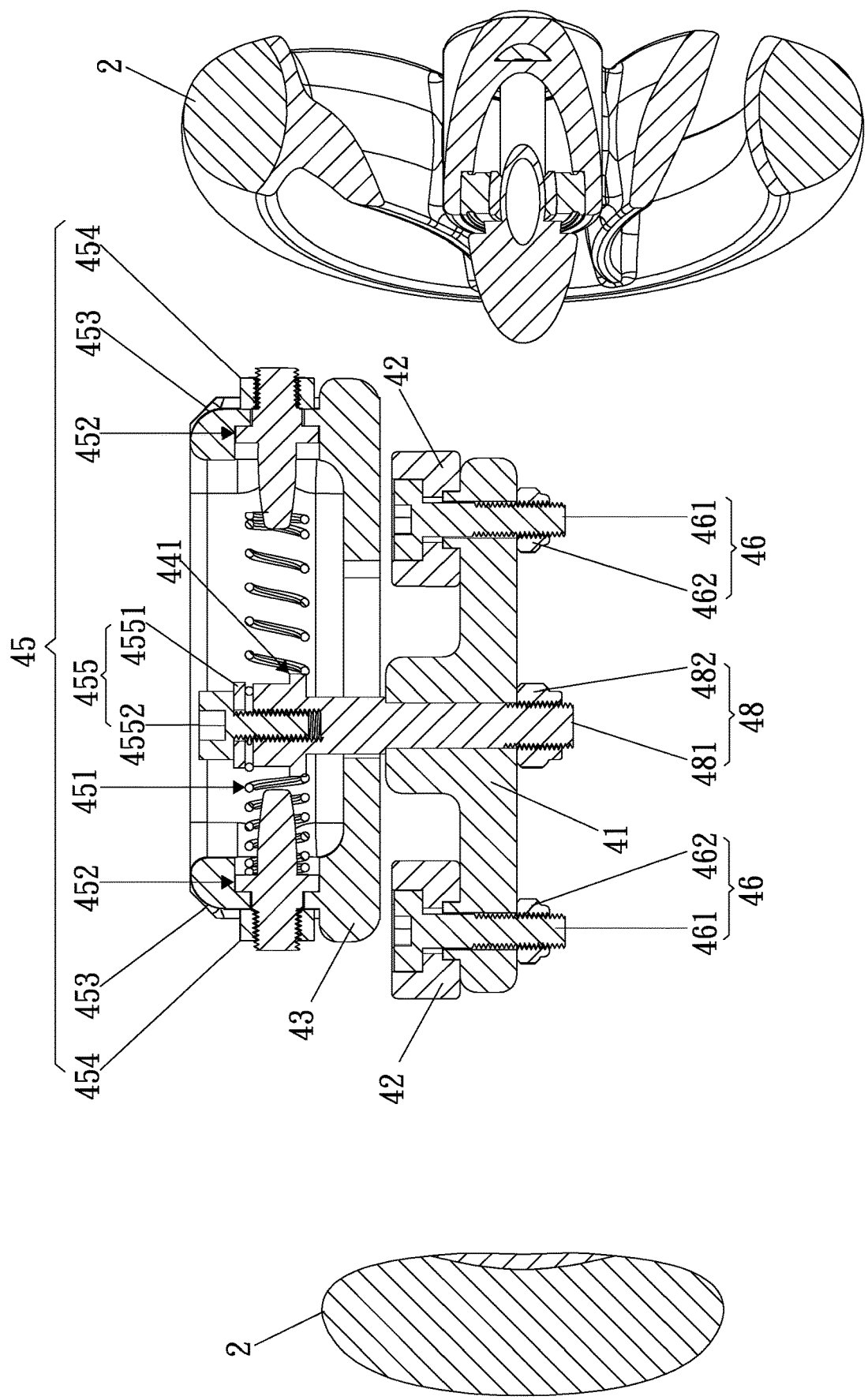
FIG. 10 is a longitudinal sectional view of FIG. 7.
Figure 11:
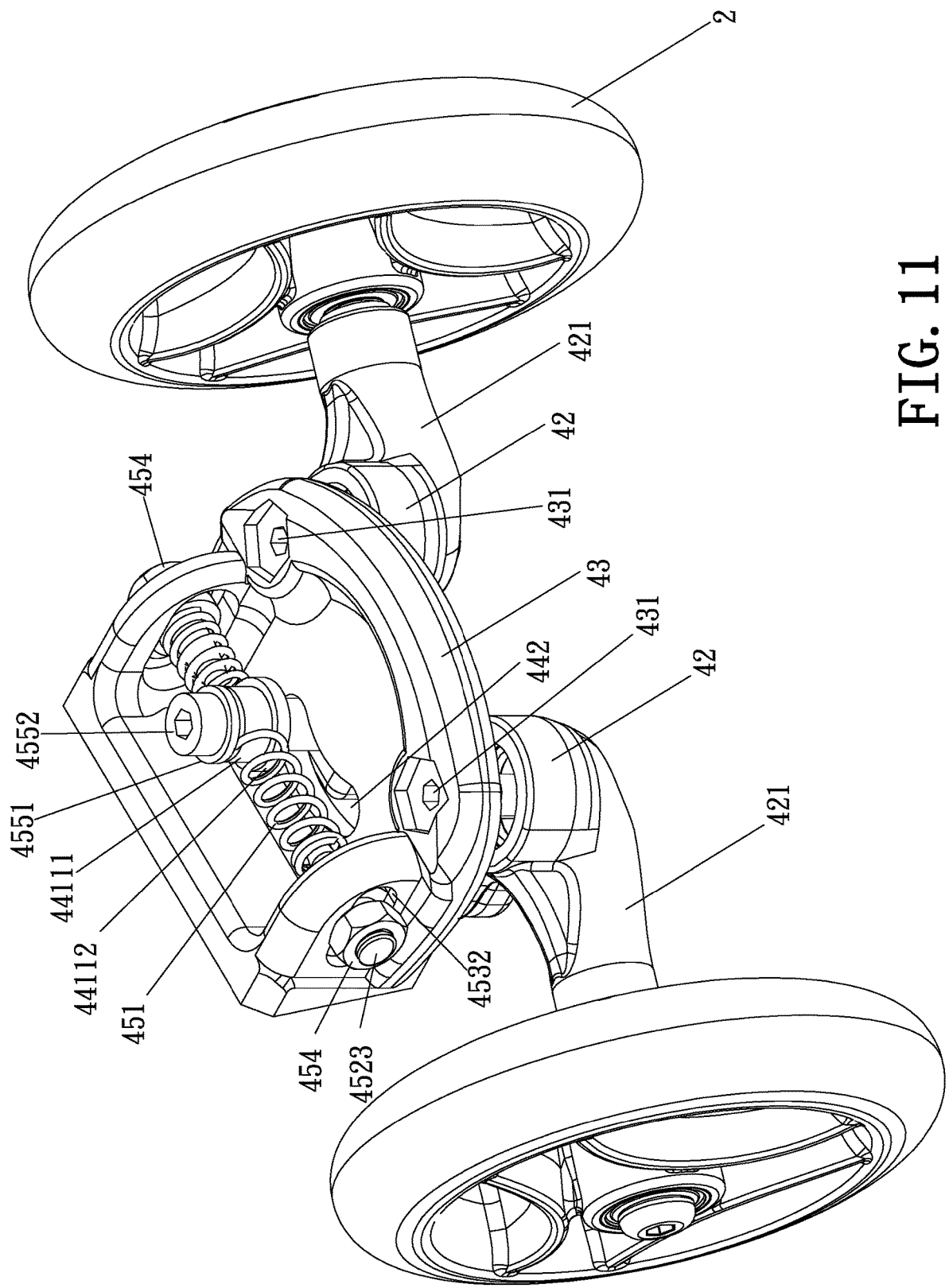
FIG. 11 is a view similar to FIG. 2 showing the front wheels turning right.
Figure 12:
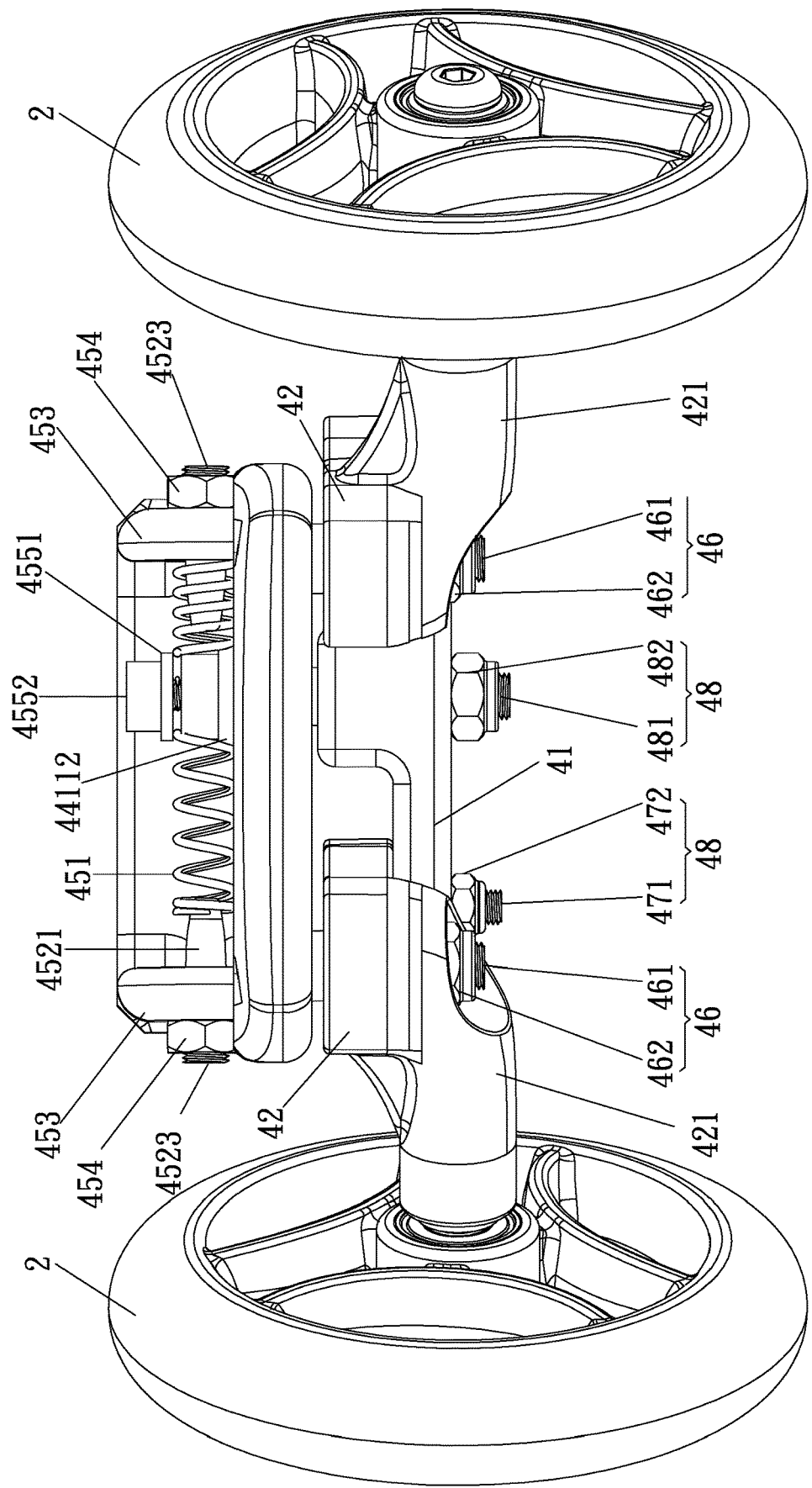
FIG. 12 is a front view of FIG. 11.
Figure 13:
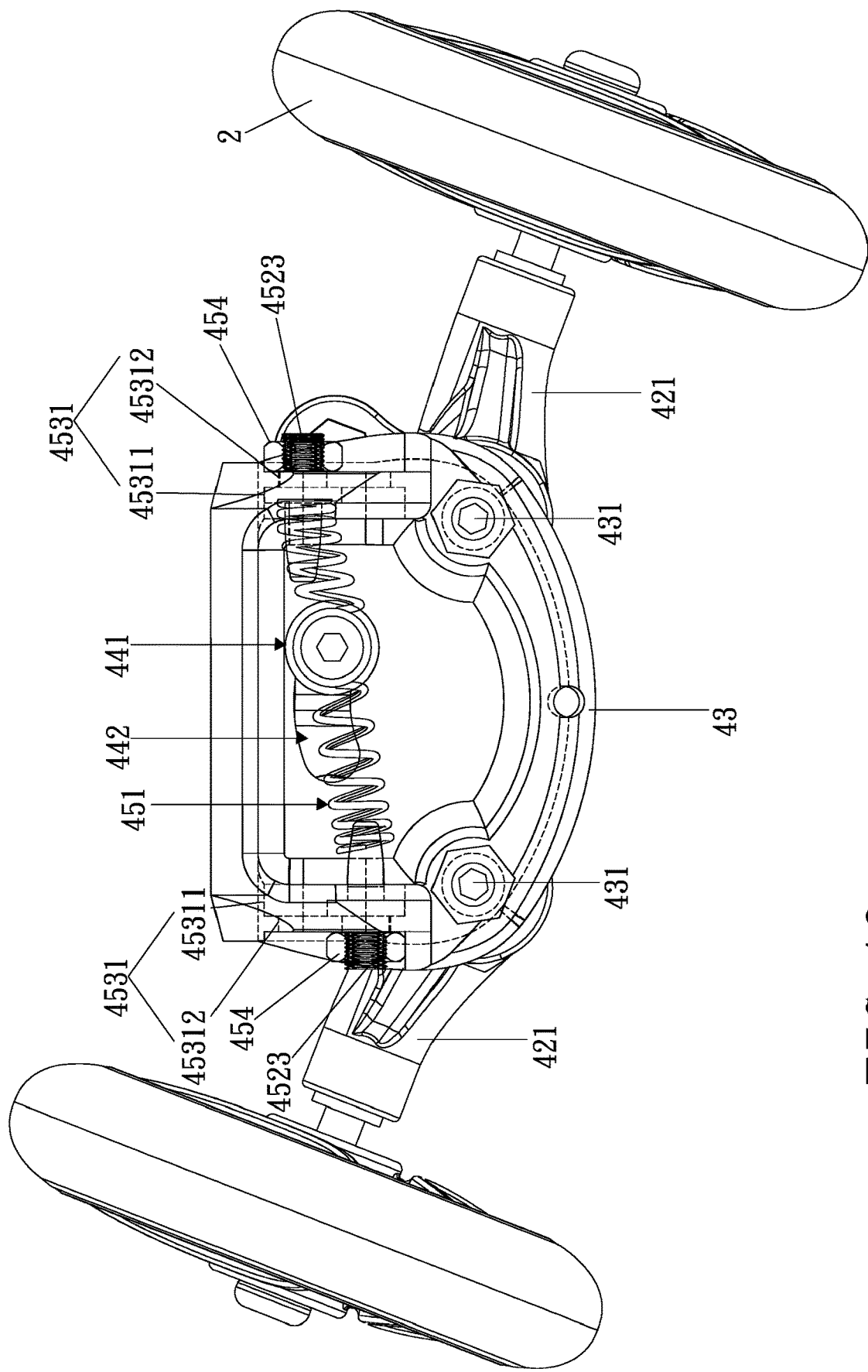
FIG. 13 is a top view of FIG. 11.
Figure 14:
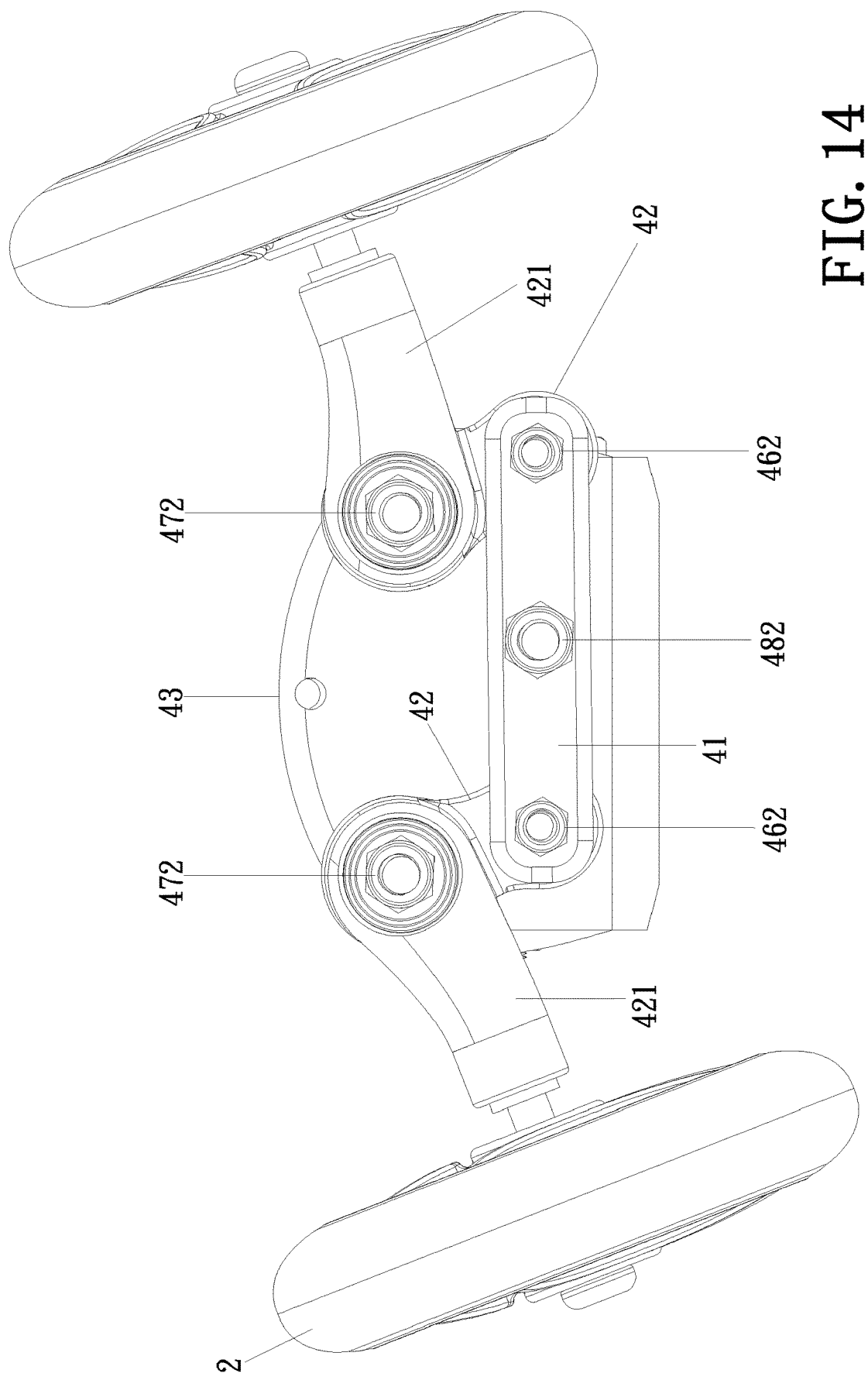
FIG. 14 is a bottom view of FIG. 11.
Figure 15:
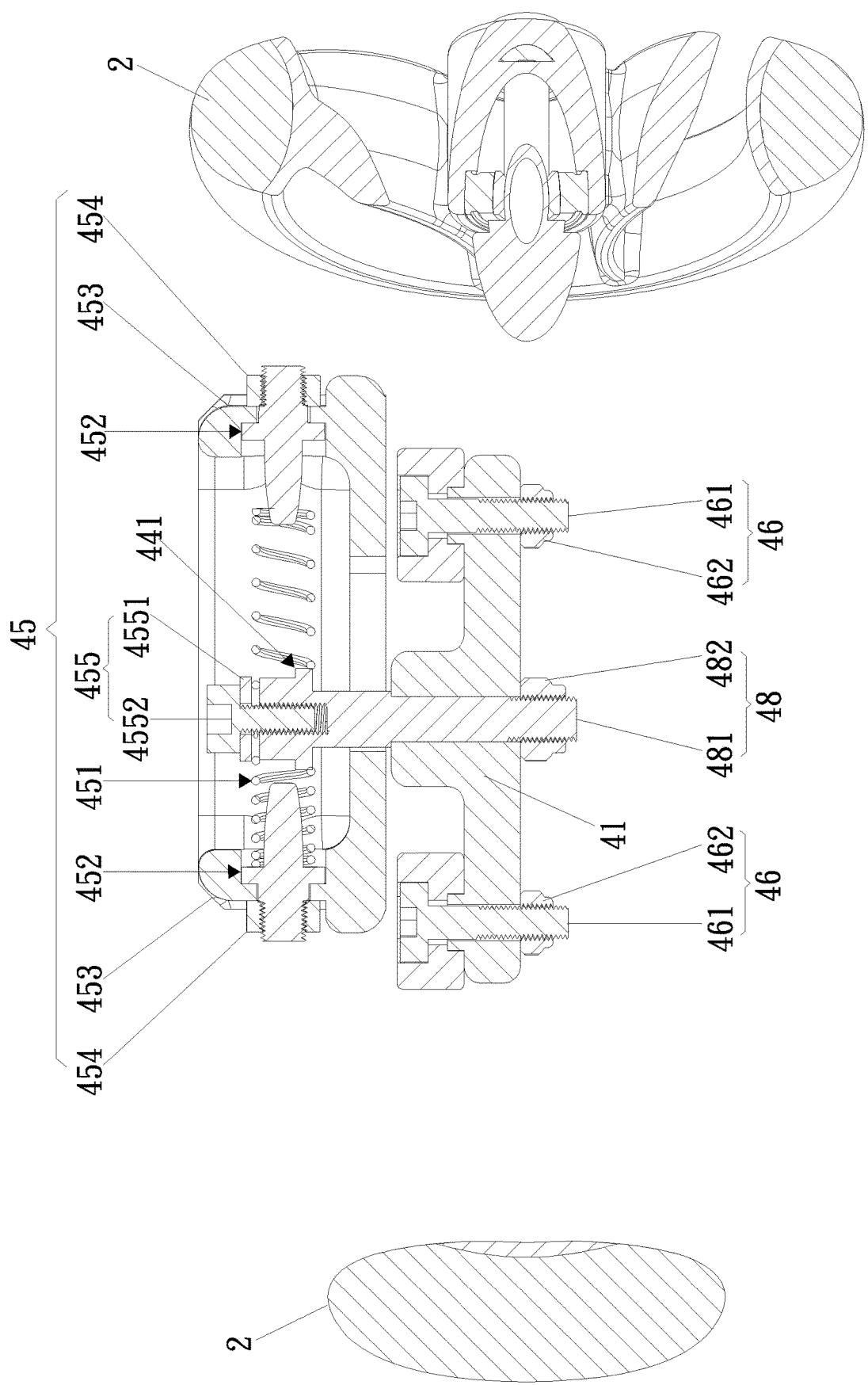
FIG. 15 is a longitudinal sectional view of FIG. 12.

Referring to FIGS. 1 to 15, a kick scooter of the invention comprises a deck 1, two front wheels 2 disposed forwardly of the deck 1, a rear wheel 3 at a rear end of the deck 1, a mount 5 at a front end of the deck 1 and having a socket 51 for fastening a steering tube (not shown), and a steering control device 4 comprising the following components as discussed in detail below.

A connecting member 41 includes an intermediate upward projection 412 having a hole 4121, and two wings 411 having a hole 4111.

Two linking assemblies 42 each includes a linking bar 421 having one end connected to a hub of either front wheel 2, a first pivot hole 423 connected to the other end of the linking bar 421, and a second pivot hole 424 at an open end.

A seat 43 includes two downward pivots 431 through two front corners respectively.

A limit mechanism 44 includes a transverse oval hole 442 through a rear portion of the seat 43, and a limit pin 441 movable in the oval hole 442 and including an upper stop member 4411 having a top projection 44111, an upper rim 44112 adapted to engage the oval hole 442, and a threaded hole 44113 in the top projection 44111, and a shank 4412 having a bare first section 44121 passing through the oval hole 442, and a bare second section 44122 having a diameter less than that of the first section 44121.

A restoring mechanism 45 includes a torsion spring 451 engaged with the rim 44112; a fastening member 455 having a washer 4551 and a screw 4552 driven through the washer 4551 into the threaded hole 44113 to fasten the spring 451; two armrests 453 on two sides of the seat 43 respectively with the oval hole 442 disposed therebetween, the armrest 453 having a through hole 4531; two positioning members 452 each moveably disposed through the through hole 4531 and having an anchor 4521 at one end disposed in either end of the spring 451, a threaded section 4523 at the other end, and an intermediate annular flange 4522 stopped by an inner end of the through hole 4531; and two nuts 454 each secured to the threaded section 4523 to fasten the positioning member 452 and the armrest 453 together.

Two first fastening members 46 includes a threaded pivot 461 formed on one of two rear bottom corners of the seat 43 and passing through the second pivot hole 424 and the hole 4111, and a nut 462 secured to the threaded pivot 461 to pivotably fasten the seat 43, the linking assembly 42, and the connecting member 41 together.

Two second fastening members 47 includes a threaded pivot 471 formed on a bottom of either pivot 431 and passing through the first pivot hole 423, and a nut 472 secured to the threaded pivot 471 to pivotably fasten the seat 43 and the linking assembly 42 together.

A third fastening member 48 includes a threaded pivot 481 formed at a bottom of the bare second section 44122 and passing through the hole 4121, and a nut 482 secured to the threaded pivot 481 to pivotably secure the connecting member 41 to the limit pin 441.

Both the left and right portions of the spring 451 are not biased when the kick scooter moves along a straight line, the limit pin 441 is disposed at a middle point of the oval hole 442, and the linking assemblies 42 are shaped as a right triangle.

As shown in FIGS. 6 to 10 specifically, a left turn of the front wheels 2 is described below. In response to turning left, the foot of a player may exert a force to the left side of the deck 1. The left front wheel 2 turns left and the right front wheel 2 also turns left due to the leftward movement of the connecting member 41. And in turn, the limit pin 441 moves rightward in the oval hole 442 to compress the right portion of the spring 451 and expand the left portion of the spring 451. Thus, the left positioning member 452 moves forward in one through hole 4531 and the right positioning member 452 moves rearward in the other through hole 4531 (see FIG. 8). Further, the linking assemblies 42 pivot leftward about the threaded pivots 461 when the front wheels 2 turn leftward. Left turning angles of the front wheels 2 are maximum values when the limit pin 441 moves to the right end of the oval hole 442.

As shown in FIGS. 11 to 15 specifically, a right turn of the front wheels 2 is described below. In response to turning right, the foot of the player may exert a force to the right side of the deck 1. The left front wheel 2 turns right and the right front wheel 2 also turns right due to the rightward movement of the connecting member 41. And in turn, the limit pin 441 moves leftward in the oval hole 442 to compress the left portion of the spring 451 and expand the right portion of the spring 451. Thus, the left positioning member 452 moves rearward in one through hole 4531 and the right positioning member 452 moves forward in the other through hole 4531 (see FIG. 13). Further, the linking assemblies 42 pivot rightward about the threaded pivots 461 when the front wheels 2 turn rightward. Right turning angles of the front wheels 2 are maximum values when the limit pin 441 moves to the left end of the oval hole 442.

It is envisaged by the invention that a portion of the elastic force of the spring 451 is absorbed by the positioning members 452 in the left or right turn of the kick scooter. Thus, the spring 451 suffers less wear and in turn, it can prolong the useful life of the spring 451.

It is also envisaged by the invention that the connecting member 41, the linking assemblies 42, the seat 43, the limit mechanism 44, and the restoring mechanism 45 are provided on the seat 43. Thus, the steering control device 4 occupies a minimum space.

It is further envisaged by the invention that the connecting member 41 and the linking assemblies 42 form a parallelepiped which is structurally simple and more effective for controlling a turning of the front wheels 2.

It is still further envisaged by the invention that the stop member 4411 is capable of securely retaining the spring 451 so that different portions of the spring 451 may expand and compress at the same time by the movement of the limit pin 441.

While the invention has been described in terms of preferred embodiments, those skilled in the art will recognize that the invention can be practiced with modifications within the spirit and scope of the appended claims.

What is claimed is:

1. A steering control device of a kick scooter including a deck and two front wheels, comprising:
    a seat disposed at a front end of the deck and including first, second, third, and fourth pivots, a transverse oval hole, and two side armrests each having a through hole;
    a connecting member including an intermediate hollow projection, and two wings having a hole;
    two linking assemblies each including a linking bar having one end connected to one of the front wheels, a first pivot hole connected to the other end of the linking bar, and a second pivot hole at an open end;
    a limit pin movably disposed in the transverse oval hole and including an upper member having a threaded hole and a rim engaged with the transverse oval hole, a threaded lower member disposed through the intermediate hollow projection, and a nut secured to the threaded lower member to fasten the limit pin and the connecting member together; and
    a restoring mechanism including a biasing member engaged with the rim, a threaded fastener secured to the threaded hole to securely retain the biasing member, and two positioning members each moveably disposed through the through hole and having an anchor at one end disposed in either end of the biasing member, a threaded section at the other end, an intermediate flange stopped by the through hole, and two nuts each secured to the threaded section to pivotably secure the connecting member to the limit pin;
    wherein the first and second pivots are disposed through the first pivot holes to pivotably fasten the seat and the linking assembly together; and
    wherein the third and fourth pivots are disposed through the second pivot holes and the holes of the wings to pivotably fasten the seat, the linking assembly, and the connecting member together.

* * * * *